United States Patent
Oliver (10) Patent No.: US 8,565,396 B1
(45) Date of Patent: Oct. 22, 2013

(54) SYSTEMS AND METHODS TO DETECT A SCAM ON A COMMUNICATIONS DEVICE

(75) Inventor: Ian Oliver, Manly Vale (AU)

(73) Assignee: Symantec Corporation, Mountain View, CA (US)

(*) Notice: Subject to any disclaimer, the term of this patent is extended or adjusted under 35 U.S.C. 154(b) by 0 days.

(21) Appl. No.: 13/273,906

(22) Filed: Oct. 14, 2011

(51) Int. Cl.
*H04M 1/56* (2006.01)

(52) U.S. Cl.
USPC ............ 379/142.01; 379/114.14; 379/144.03; 379/210.02

(58) Field of Classification Search
USPC ............ 379/142.01, 210.02, 210.03, 221.03, 379/413.04, 114.14, 144.03, 88.18, 88.26
See application file for complete search history.

(56) References Cited

U.S. PATENT DOCUMENTS

| | | | |
|---|---|---|---|
| 5,956,635 A * | 9/1999 | Hoogerwerf et al. ......... | 455/411 |
| 7,870,608 B2 * | 1/2011 | Shraim et al. .................. | 726/22 |
| 7,949,716 B2 * | 5/2011 | Alperovitch et al. ......... | 709/206 |
| 2007/0239604 A1 * | 10/2007 | O'Connell et al. ............. | 705/50 |
| 2009/0245483 A1 * | 10/2009 | Shibuya et al. ............. | 379/88.12 |

OTHER PUBLICATIONS

Kellner, Mark A., Avoiding High-Priced 'Anti-Virus' Scam, The Washington Times, Aug. 31, 2011 (3 pgs.).
Liebowitz, Matt, How to Avoid 9111 Anniversary Scams, SecuirtyNewsDaily, Aug. 29, 2011 (4 pgs.).
Website: http://ww.scamwatch.gov.au/content/index.phtml/tag/MobilePhoneScams, Scam Watch, Commonwealth of Australia 2011 (2 pgs.).

\* cited by examiner

*Primary Examiner* — Duc Nguyen
*Assistant Examiner* — Yosef K Laekemariam
(74) *Attorney, Agent, or Firm* — Holland & Hart LLP (57) ABSTRACT

A computer-implemented method to detect scam on a communications device is described. An incoming communication is detected at the communications device. A determination is made as to whether a requested response message is detected. The requested response message is analyzed to determine whether the message is suspicious. A response message to the incoming communication is detected. The response message is blocked based on a determination that the requested response message is suspicious.

20 Claims, 8 Drawing Sheets

SYSTEMS AND METHODS TO DETECT A SCAM ON A COMMUNICATIONS DEVICE

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies is always desirable to anyone who uses and relies on computers.

Computing systems may be mobile so that users may carry these systems as they travel, shop, work, etc. Mobile computing systems may also be mobile communication devices, such as cellular telephones. Mobile communication devices allow users to initiate and receive telephone calls at mobile locations. In addition, mobile communication devices may also receive electronic mail, receive short messaging system (SMS) messages (i.e., text messages), browse the Internet, and the like.

The growing popularity of mobile communication devices has also led to an increased number of attacks on these types of devices. The attacks may be scams designed to trick a user into subscribing or purchasing products or services. For example, attackers may randomly dial phone numbers assigned to mobile communication devices. The user may be unknowingly charged for products or services if the call is answered or if the user calls back the number.

SUMMARY

According to at least one embodiment, a computer-implemented method to detect scam on a communications device is described. An incoming communication is detected at the communications device. A determination is made as to whether a requested response message is detected. The requested response message is analyzed to determine whether the message is suspicious. A response message to the incoming communication is detected. The response message is blocked based on a determination that the requested response message is suspicious.

In one example, a determination may be made as to whether the incoming communication is sent from an unknown source. In one configuration, an informational alert that indicates the incoming communication is a scam may be generated. The incoming communication may be a telephone call. The incoming communication may be a short messaging service (SMS) message.

In one embodiment, a bait flag linked to the incoming communication may be detected. The bait flag may be a missed call indicator. The bait flag may be an alert indicating receipt of an incoming SMS message. A suspicious requested response message may be a request to establish communications with a premium telephone number.

A communications device configured to detect a scam is also described. The device may include a processor and memory in electronic communication with the processor. The device may further include a scam detection module stored in the memory. The module may detect an incoming communication at the communications device and determine whether a requested response message is detected. In addition, the module may analyze the requested response message to determine whether the message is suspicious, and detect a response message to the incoming communication. The module may also block the response message based on a determination that the requested response message is suspicious.

A computer-program product for detecting a scam is also described. The computer-program product may include a non-transitory computer-readable medium having instructions thereon. The instructions may include code programmed to detect an incoming communication at the communications device, and code programmed to determine whether a requested response message is detected. The instructions may further include code programmed to analyze the requested response message to determine whether the message is suspicious, and code programmed to detect a response message to the incoming communication. Further, the instructions may include code programmed to block the response message based on a determination that the requested response message is suspicious.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Whether in the form of a consumer attempting to defraud a telephone company, the telephone company attempting to defraud the consumer, or a third party attempting to defraud either of them, fraud and scams have been a part of the telephone system almost from the beginning. There are many types of phone scams that have caused financial damage to the victims.

One example is the "missed call" scam. This may also be referred to as the "wangiri" scam (one (ring) and cut) because this type of scam may have originated in Japan. The scam may involve a computer using multiple phone lines to dial mobile phone numbers at random. The numbers appear as missed calls on the recipient's mobile. Believing a legitimate call was cut off, or simply curious, users are enticed to call back. The number to call back may be a premium number that charges the user a hefty fee. In addition, when the user calls back, he/she may be presented with a recorded advertising message that offers various services. The user may unknowingly subscribe to these services by simply calling back the missed number.

As another example, instead of a missed call, the user may answer the incoming call. The user may speak with a fraudulent operator or hear a recorded advertising message. The operator or recorded message may instruct the user to press certain keys on their mobile phone, or dial a certain number, to claim a prize, for example. By doing so, the user may unknowingly subscribe to or purchase certain services. The user may then be billed for such services by his/her communications provider.

In addition to telephone calls, this type of scam may use short message service (SMS) messages to deceive the user. For example, the user may receive an SMS message (i.e., a text message) that includes words that catch the user's attention and raise the user's level of curiosity. The message may include the words "congratulations", "free ring tones", "claim your prize", and the like. The message may request a response from the user. Such as sending a reply to the received SMS message, dial a certain number listed in SMS message, etc. If the user responds, he/she may unknowingly subscribe to or purchase services that may be unwanted by the user. Further, as part of the scam described above, the user may knowingly subscribe to or purchase certain services, but there may be hidden fees that are unknown to the user.

Current scam detection schemes do not identify when a mobile phone is the target of a missed call or SMS message type of scam. The present systems and methods detect and identify when scams of this nature are occurring on a mobile phone. For example, the user may be informed that the missed call or the received SMS message may be related to a scam and the user may be prevented from subscribing to or purchasing unwanted services or connecting to a premium number that will incur charges for the user.

Figure 1:
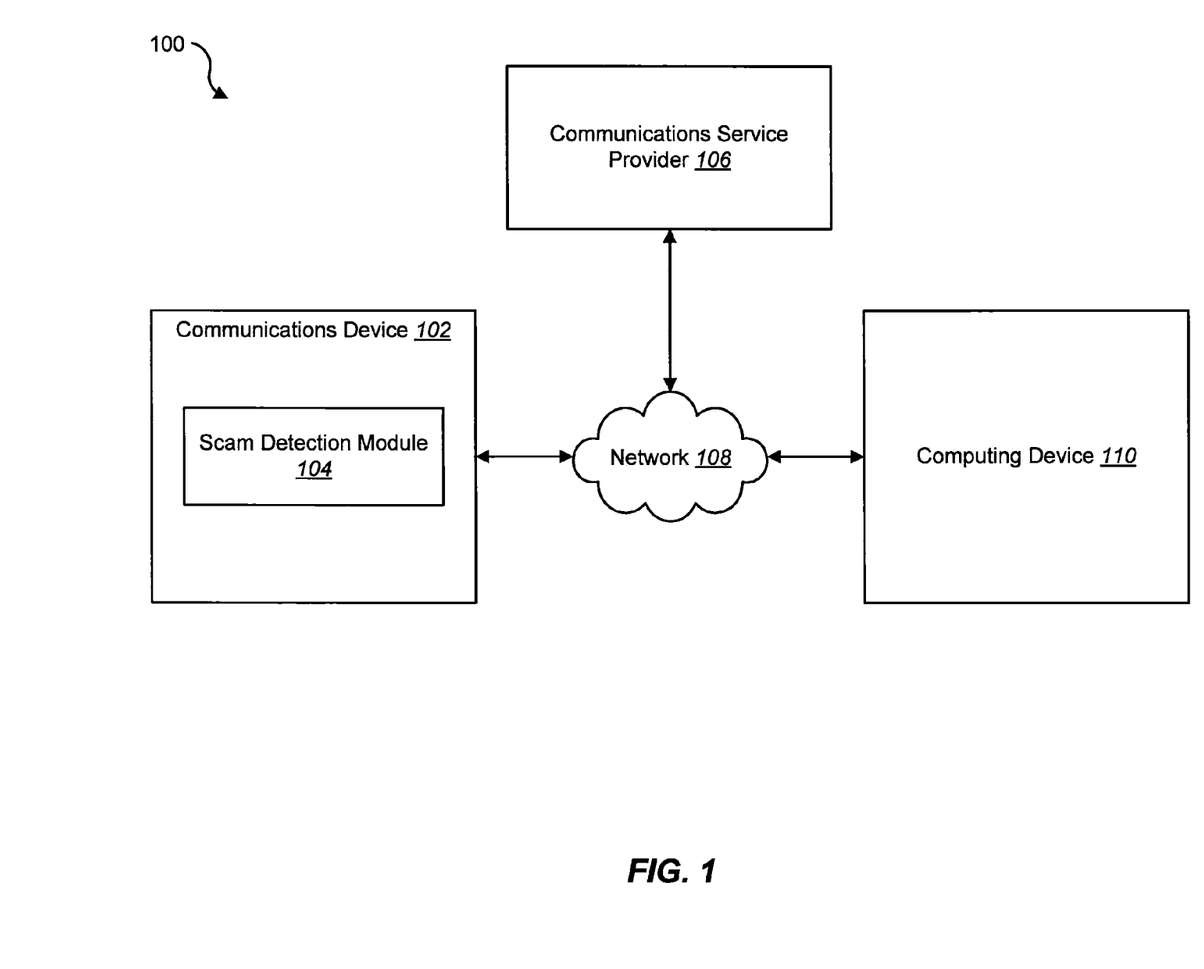
FIG. 1 is a block diagram illustrating one embodiment of an environment in which the present system and methods may be practiced.

FIG. 1 is a block diagram illustrating one embodiment of an environment 100 in which the present system and methods may be practiced. In one example, a communications device 102 may communicate with a computing device 110. The communications device 102 may be, but is not limited to, a cellular telephone, a smartphone, a mobile device, or any other type of communications device. The computing device 110 may be a personal computer (PC), a server, a laptop, a notebook, a smartphone, a tablet, a mobile phone, or any other type of computing device. The environment 100 may also include a communications service provider 106. The provider 106 may provide communication services to the communications device 102. In one configuration, the communications device 102, the computing device 110, and the communications service provider 106 may communicate with each other via a network 108 connection.

In one example, the computing device 110 may contact the communications device 102. For example, the computing device 110 may use phone lines and dial the number assigned to the communications device 102. As another example, the computing device 110 may transmit a message, such as an SMS message, to the number assigned to the communications device 102.

The communications device 102 may include a scam detection module 104. In one configuration, the module 104 may detect possible scamming activities involving the communications device 102. For example, the module 104 may detect incoming calls or messages directed to the communications device 102. The module 104 may further analyze certain characteristics of the incoming call or message as well as actions taken by the use of the communications device 102 in response to the incoming communications. Based upon this analysis, the scam detection module 104 may detect a possible scam and notify the user of the communications device 102. Details regarding the scam detection module 104 will be described below.

Figure 2:
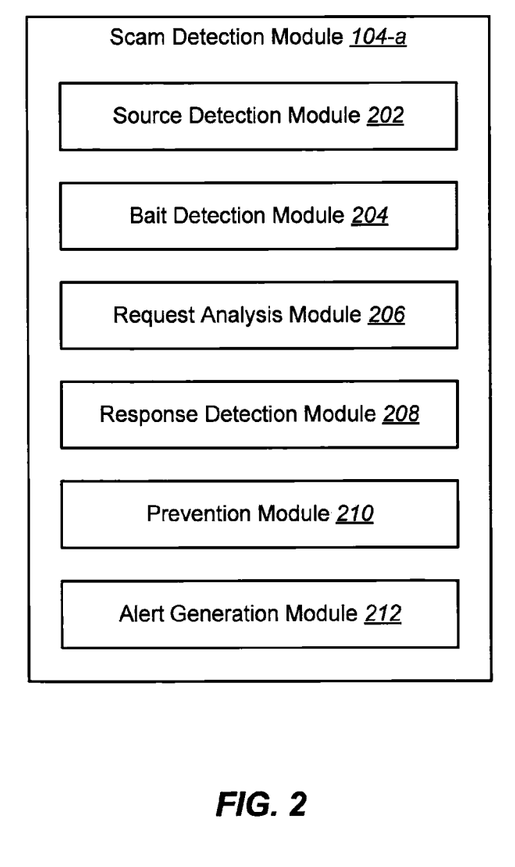
FIG. 2 is a block diagram illustrating one embodiment of a scam detection module.

FIG. 2 is a block diagram illustrating one embodiment of a scam detection module 104-a. The module 104-a may be an example of the module 104 of FIG. 1. In one configuration, the scam detection module 104 may include a source detection module 202, a bait detection module 204, a request analysis module 206, a response detection module 208, a prevention module 210, and an alert generation module 212. The scam detection module 104-a may detect and identify possible fraudulent activity occurring on the communications device 102.

In one example, the source detection module 202 may identify the source of an incoming communications, such as a call or message, directed to the communications device 102. For example, the source detection module 202 may identify the source as an unknown or a known source. The source may be classified as a known source if information about the source is included in a contacts list, address book, etc. stored on the communications device 102. For example, a telephone number assigned to the source may be stored in an electronic address book on the communications device 102. As a result, when an incoming communication is detected that originates from a number stored in an electronic address book on the communications device 102, the source detection module 202 may identify the source as a known source. The source may also be identified as a known source if the number assigned to the source is included in an incoming call log stored on the communications device 102 that includes the numbers assigned to devices that recently originated calls or messages to the communications device 102. The source may further be classified as a known source if the number of the device that originated the call or message is included in an outgoing log stored on the communications device 102. The outgoing log may include numbers of outgoing calls or messages originating from the communications device 102. A number that is identified as a known number may be displayed on the communications device 102 with an indicator that indicates the number is a known number. For example, the name of an individual associated with the number may be displayed instead of the number. Further, a frequency number may appear next to the number indicating the number of times incoming communications or outgoing communications have been established with this particular number.

If an incoming call or message originates from a number that is not recognized (e.g., the number is not in the address book, a contacts list, a log of recent incoming or outgoing communications, etc.), the source detection module 102 may identify the number as unknown. The unknown number may be displayed on the communications device 102 in a log of incoming communications. Instead of displaying the actual unknown number, the text "Unknown" may be displayed to the user.

In one embodiment, the bait detection module 204 may detect a bait flag for an incoming communications (call or message) originating from an unknown source. The bait flag may be a "missed call" indicator for an incoming call. For an incoming SMS message, the bait flag may be an indicator that an SMS message has been received. In addition, the bait flag may include words or phrases in the SMS message that arouse the user's curiosity. For example, the words or phrases "congratulations", "claim your prize", etc. may be included in the message to catch the user's attention and cause the user to have a desire to respond to the SMS message.

In one example, the incoming communication may include a request for the recipient of the communication to respond. For example, an incoming call from an unknown source may be missed. The communications device 102 may display a "missed call" message that represents the bait flag. This flag may elicit curiosity from the recipient so that the recipient calls back the number. If, instead of receiving a "missed call" message, the recipient may answer the incoming call. Upon answering the call, the recipient may hear a recorded message or may speak with a live person. The recorded message or the live person may request that the recipient press one or more buttons on the communications device 102.

If the incoming communications is an SMS message, the message may request the recipient to follow a hyperlink embedded in the message or the message may request the recipient to call a certain number or send a response SMS message. The request analysis module 206 may analyze these various responses that are requested of the recipient. The analysis module 206 may determine whether the requested response would lead the recipient to call back a premium number, subscribe to or purchase a service, etc.

The response detection module 210 may detect whether the recipient initiates a response to the incoming communications. For example, the module 210 may detect when the recipient calls back a missed call from an unknown source, where the call back number is a premium number. The module 210 may also detect when the recipient attempts to send a reply to an SMS message, where replying to the message may cause the recipient to purchase or subscribe to certain services. The module 210 may also detect whether the recipient calls back a non-premium number, but is later redirected to a premium number. Upon detecting an attempted response by the recipient, the prevention module 210 may block or prevent the response from being executed. For example, a return call or a reply to an SMS message may be blocked. The alert generation module 212 may generate an alert that informs the user that executing the response may result in extra phone charges, the purchase of a product, the subscription to a service, and the like. The user may then make an informed decision on whether or not to continue and respond to the incoming communication.

Figure 3:
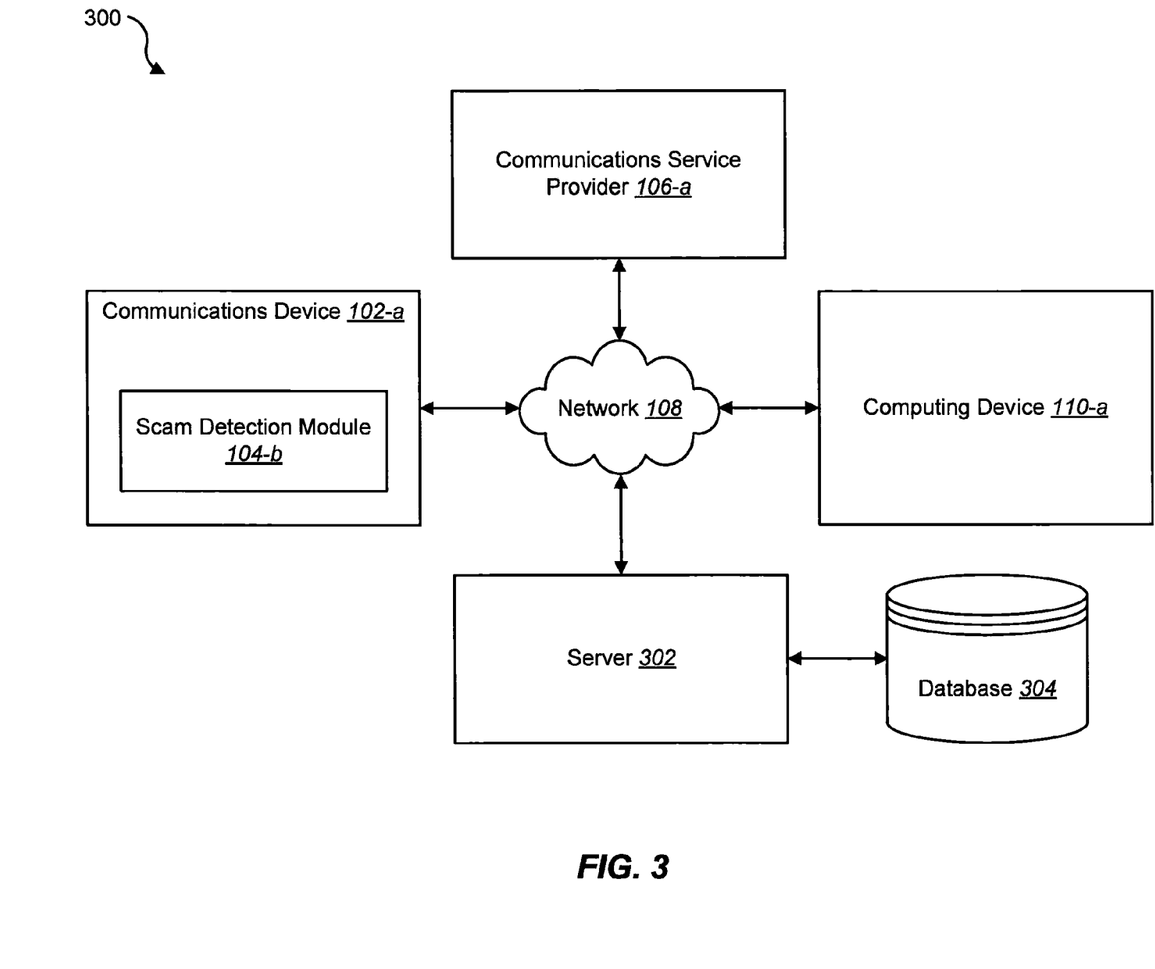
FIG. 3 is a block diagram illustrating another embodiment of an environment in which the present systems and methods may be implemented.

FIG. 3 is a block diagram illustrating one embodiment of an environment 300 in which the present systems and methods may be implemented. In one example, a communications device 102-a may communicate with a communications service provider 106-a and a computing device 110-a across a network 108 connection. The communications device 102-a, the communications service provider 106-a, and the computing device 110-a may be examples of the communications device 102, the communications service provider 106-a, and the computing device 110-a, respectively, of FIG. 1. A scam detection module 104-b may execute on the communications device 102-a. The module 104-b may be an example of the scam detection module 104 of FIG. 1 or FIG. 2. In one configuration, a server 306 may also communicate via the network 302. The server 302 may include, or be in communication with, a database 304.

In one example, the database 304 may store information regarding scams that have been detected by the scam detection module 104-b. For example, upon detecting a possible scam, the server 302 may access the database 304 and return to the communications device 102-a the number of other users who have responded, or attempted to respond, to a similar incoming communication that was detected by the module 104-b as being possibly fraudulent.

In one configuration, if an SMS message is received, the content of the message may be communicated to the server 302. The server 302 may compare the text of the SMS message against the text of other SMS messages received by other communication devices that have been identified as being possible scams. The extent of the match may increase or decrease the likelihood of the received SMS message being a fraudulent message. The likelihood may be displayed to the user of the communications device 102-a.

As described above, module 104-b may generate a warning or notification to the user regarding the likelihood of a received communications being a scam. The notification may query the user if he/she wishes to continue to block the response (e.g., a return call or a reply SMS message) or proceed and allow the response to be sent from the communications device. The decision of the user is reported to the server 302 and stored in the database 304. The database 304 may aggregate the decisions from multiple users regarding each incoming communication.

If the incoming communication is an SMS message, the scammers may select the text of the SMS message from a set of phrases and keyword combinations. The received SMS message may be reported to the server 302 and compared against SMS messages stored in the database 304 that have been received by other communication devices. If the SMS message matches a set message that was detected by other users, with the difference being to the name of the recipient, and, as an example, the name included in the SMS message matches the name of the owner of the communications device 102-a, the scam detection module 104-b may identify the SMS message as a possible scam. If the user attempts to reply to the SMS message, a notification or warning message may be generated and displayed to the user.

Figure 4:
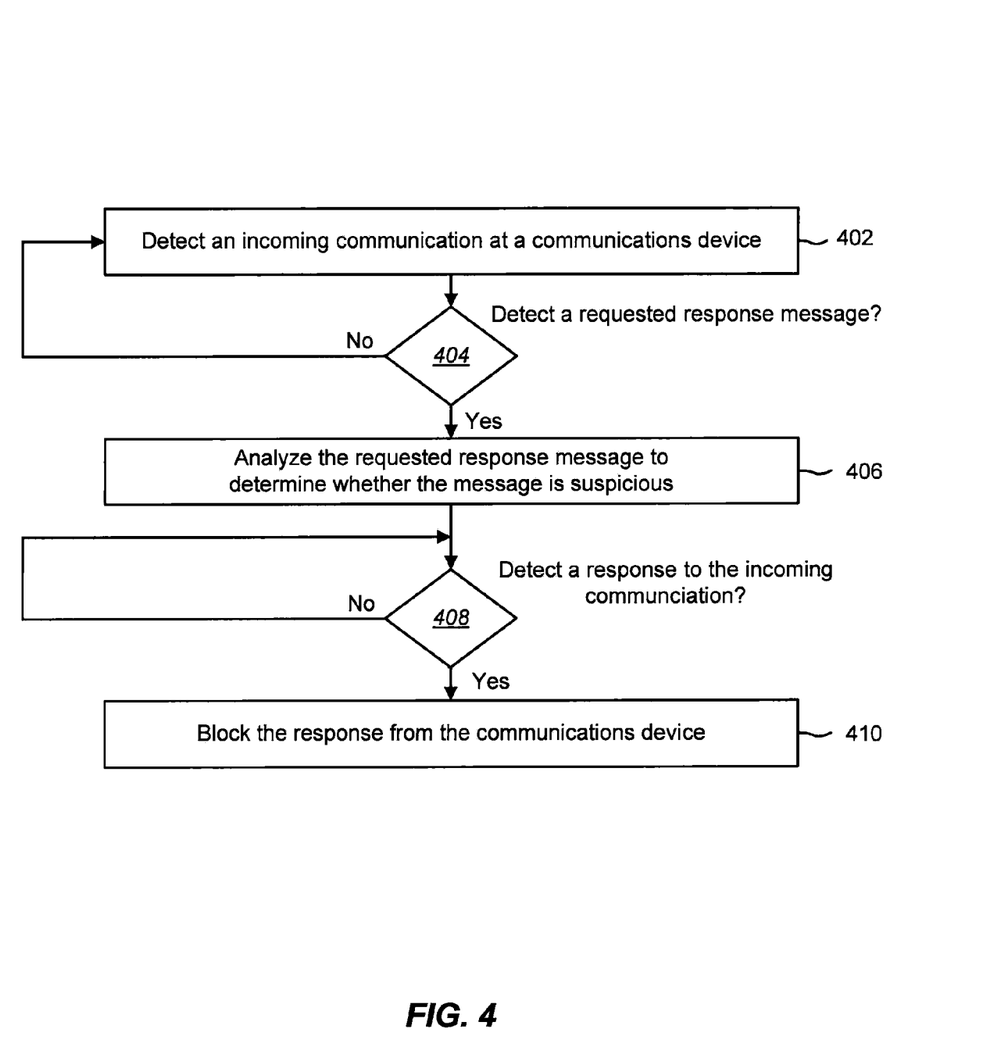
FIG. 4 is a flow diagram illustrating one embodiment of a method to detect a scam.

FIG. 4 is a flow diagram illustrating one embodiment of a method 400 to detect a scam. In one example, the method 400 may be implemented by the scam detection module 104 of FIG. 1, 2, or 3.

In one configuration, at block 402, an incoming communication may be detected at a communications device. Examples of incoming communications may include, phone calls, SMS messages, etc. At block 404, a determination may be made as to whether a request response message is detected. For example, an incoming SMS message may request the recipient to send a response message. An incoming call may request the recipient to call back or press certain keys on the communications device. If it is determined that a requested response message is not detected, the method 400 may return to detect incoming communications at the communications device. If, however, it is determined that a requested response message is detected, at block 406, the requested response message may be analyzed to determine whether the message is suspicious. For example, the requested response may be analyzed to determine if the requested response is linked to a telephone number which costs more than a regular call (i.e., a premium number). The requested response may also be analyzed to determine whether it is linked to the subscription or purchase of a service or product.

At block 408, a determination is made as to whether a response to the incoming communication is detected. For example, a determination may be made as to whether the recipient of the incoming communication responded. This response may include a call back to the number linked with the incoming communication, pressing certain keys on the communications device in response to a recorded message or instructions from a live person, sending a response SMS message to the number linked with the incoming communication, and the like. If it is determined 408 that a response has not been detected, the method 400 may continue to monitor for a response. If, however, it is determined that a response to the incoming communication is detected, at block 410, the response from the communications device may be blocked. In other words, if the response is a call back, the call back may be prevented from dialing out the number. If the response is a reply SMS message, the response may be prevented from being transmitted from the communications device, and the like.

As a result, the present systems and methods may detect an incoming communication that includes a suspicious request for a response. When the recipient attempts the respond, the response may be blocked until the recipient is made aware of the potential risks of responding.

Figure 5:
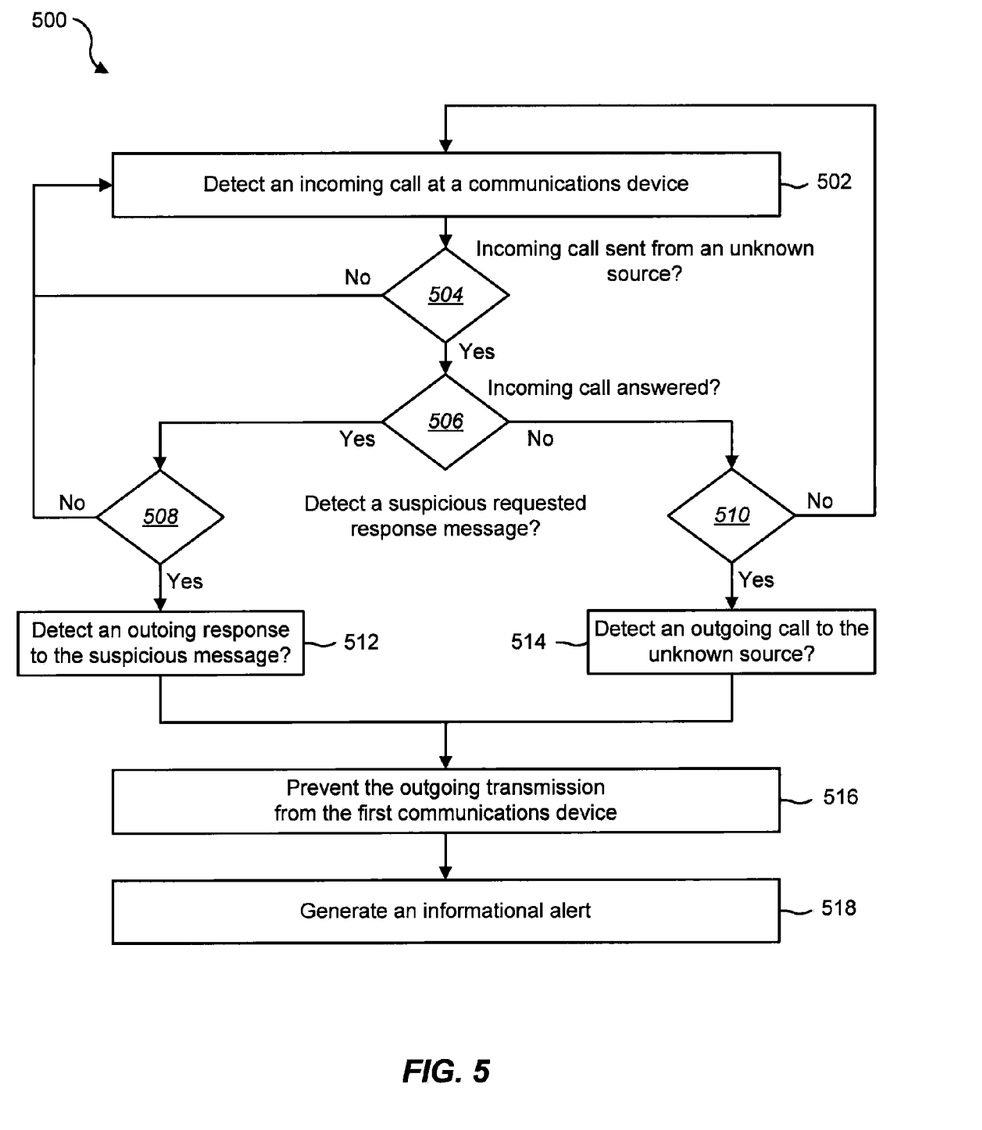
FIG. 5 is a flow diagram illustrating one embodiment of a method to detect a scam on a mobile communications device.

FIG. 5 is a flow diagram illustrating one embodiment of a method 500 to detect a scam on a mobile communications device. The method 500 may be implemented by the scam detection module 104 of FIG. 1, 2, or 3.

In one configuration, at block 502, an incoming call may be detected at the communications device 102. At block 504, a determination may be made as to whether the incoming call originated from an unknown source. If it is determined that the call did not originate from an unknown source, the method 500 may return to detect incoming calls. If, however, it is determined that the incoming call came from an unknown source, at block 506, a determination is made as to whether the incoming call is answered by the recipient. If it is determined that the call is answered, at block 508, a determination is made as to whether a suspicious requested response message is detected. The message may be detected as suspicious if the recipient is being requested to select certain keys on the communications device 102 that result in the recipient subscribing or purchasing a service or product. Further, the request response may include a request that the recipient dial a premium number. This may result in the recipient unknowingly being charged for the call at the higher rate of premium numbers. If it is determined that the requested response message is not suspicious, the method 500 may return to detect incoming calls. If, however, it is determined that the requested response is suspicious, at block 512, an outgoing response to the suspicious message is detected.

Returning to block 506, if it is determined that the incoming call is not answered (missed call), at block 510, a determination is made as to whether a suspicious requested response message is detected, as described above. If it is determined that a suspicious message is not detected, the method 500 may return to detect incoming calls at the communications device 102. If, however, it is determined that the requested response message is suspicious, an outgoing call to the unknown source may be detected at block 514. For example, the recipient may access the missed call log and select the option to call back the number linked to the missed call. In addition, the scam detection module 104 may detect the recipient manually typing in the number linked to the missed call to initiate a call back.

At block 516, the transmission of the outgoing response (call back) may be prevented. For example, the communications device 102 may be blocked from executing the call back. At block 518, an informational alert may be generated and displayed to the recipient. The alert may notify the user that responding to the incoming call may result in unwanted charges or subscriptions. The user may then ignore the alert and execute the call back or heed the alert message and abort the call back.

In one example, at blocks 508 and 510, the requested response message may not be initially identified as being suspicious. For example, the message or live person may request the recipient of the incoming call to call back a non-premium number. However, upon dialing the non-premium number, the communications device 102 may be redirected to establish communications with a premium number. At the time of the redirection, the communications may be blocked and the informational alert may be generated and provided to the user. The user may decide whether to continue to establish communications or abort the call back process.

Figure 6:
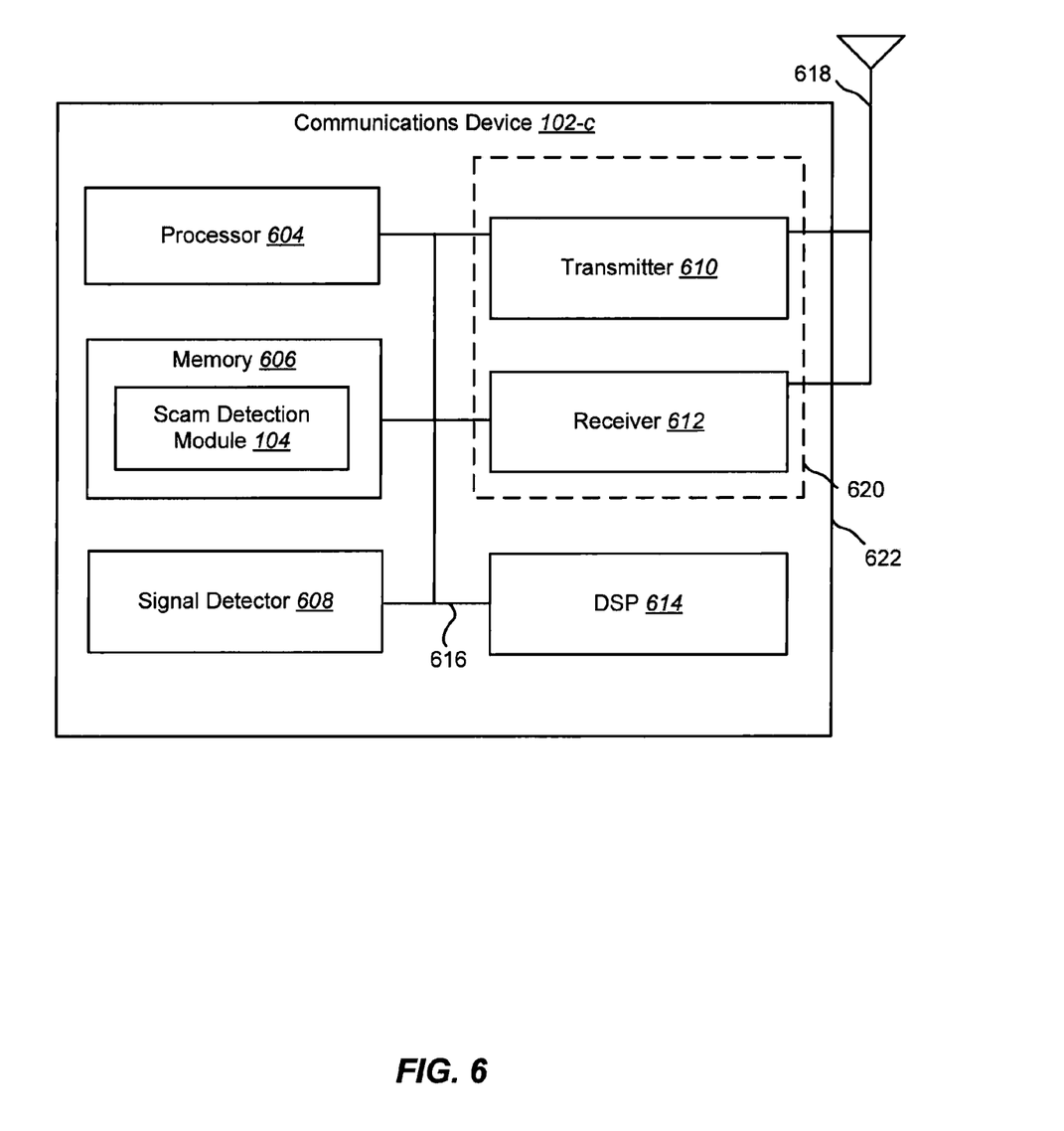
FIG. 6 illustrates various components that may be used in a communications device.

FIG. 6 illustrates various components that may be used in a communications device 102-c. The communications device 102-c is an example of the communications device of FIG. 1 or 3.

The communications device 102-c may include a processor 604 which controls operation of the communications device 102-c. The processor 604 may also be referred to as a central processing unit (CPU). Memory 606, which may include both read-only memory (ROM) and random access memory (RAM), provides instructions and data to the processor 604. A portion of the memory 606 may also include non-volatile random access memory (NVRAM). The processor 604 typically performs logical and arithmetic operations based on program instructions stored within the memory 606. The instructions in the memory 606 may be executable to implement the methods described herein. For example, the scam detection module 104 may be stored in the memory 606.

The communications device 102-c may also include a housing 622 that may include a transmitter 610 and a receiver 612 to allow transmission and reception of data between the communications device 102-c and a remote location. The transmitter 610 and receiver 612 may be combined into a transceiver 620. An antenna 618 may be attached to the housing 622 and electrically coupled to the transceiver 620. The communications device 102-c may also include (not shown) multiple transmitters, multiple receivers, multiple transceivers and/or multiple antennas.

The communications device 102-c may also include a signal detector 608 that may be used to detect and quantify the level of signals received by the transceiver 620. The signal detector 608 may detect such signals as total energy, pilot energy per pseudonoise (PN) chips, power spectral density, and other signals. The communications device 102-c may also include a digital signal processor (DSP) 614 for use in processing signals.

The various components of the communications device 102-c may be coupled together by a bus system 616 which may include a power bus, a control signal bus, and a status signal bus in addition to a data bus. However, for the sake of clarity, the various busses are illustrated in FIG. 6 as the bus system 616.

Figure 7:
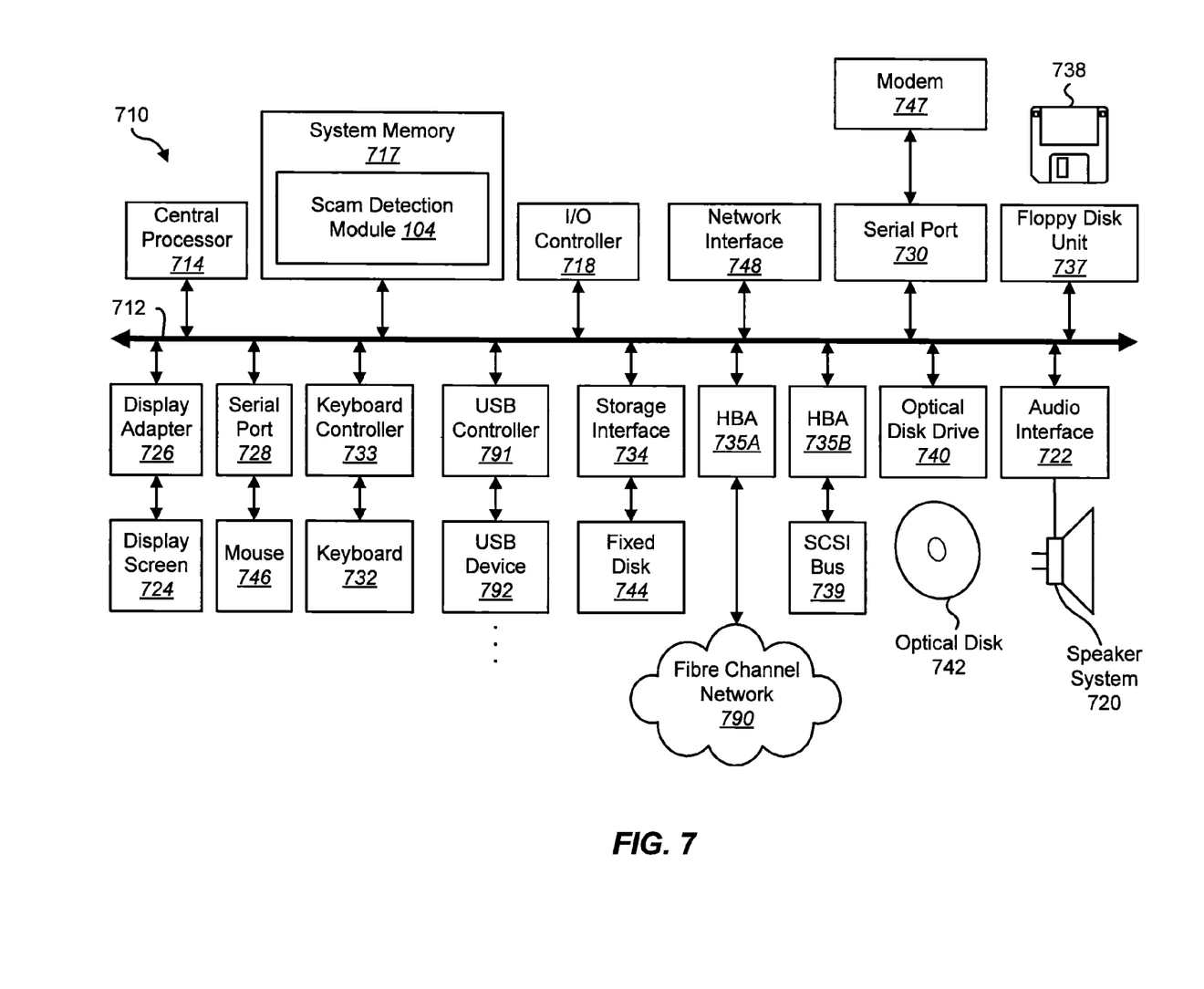
FIG. 7 depicts a block diagram of a computer system suitable for implementing the present systems and methods.

FIG. 7 depicts a block diagram of a computer system 710 suitable for implementing the present systems and methods. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), multiple USB devices 792 (interfaced with a USB controller 791), a storage interface 734, a floppy disk unit 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the scam detection module 104 to implement the present systems and methods may be stored within the system memory 717. Applications resident with computer system 710 are generally stored on and accessed via a non-transitory computer readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present systems and methods. The devices and subsystems can be interconnected in different ways from that shown in FIG. 7. The operation of a computer system such as that shown in FIG. 7 is readily known in the art and is not discussed in detail in this application. Code to implement the present disclosure can be stored in a non-transitory computer-readable medium such as one or more of system memory 717, fixed disk 744, optical disk 742, or floppy disk 738. The operating system provided on computer system 710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
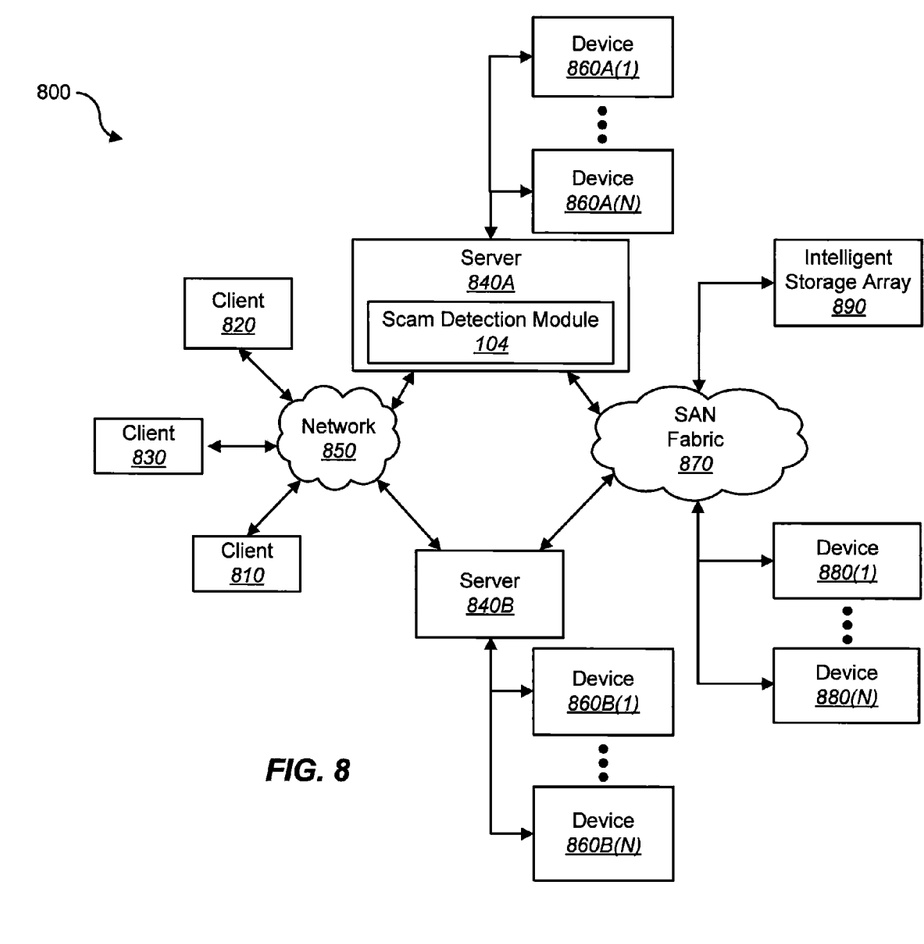
FIG. 8 is a block diagram depicting a network architecture in which client systems, as well as storage servers (any of which can be implemented using computer system), are coupled to a network.

FIG. 8 is a block diagram depicting a network architecture 800 in which client systems 810, 820 and 830, as well as storage servers 840A, 840B (any of which can be implemented using computer system 810), are coupled to a network 850. In one embodiment, the scam detection module 104 may be located within the storage servers 840A, 840B to implement the present systems and methods. The storage server 840A is further depicted as having storage devices 860A(1)-(N) directly attached, and storage server 840B is depicted with storage devices 860B(1)-(N) directly attached. SAN fabric 870 supports access to storage devices 880(1)-(N) by storage servers 840A, 840B, and so by client systems 810, 820 and 830 via network 850. Intelligent storage array 890 is also shown as an example of a specific storage device accessible via SAN fabric 870.

With reference to computer system 710, modem 747, network interface 748 or some other method can be used to provide connectivity from each of client computer systems 810, 820, and 830 to network 850. Client systems 810, 820, and 830 are able to access information on storage server 840A or 840B using, for example, a web browser or other client software (not shown). Such a client allows client systems 810, 820, and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to detect a scam on a communications device, comprising:
    detecting an incoming communication at the communications device, the incoming communication being unsolicited;
    identifying an incoming communication type based at least on the incoming communication;
    detecting a response request from the incoming communication, the response request comprising a request that a user of the communications device respond to the incoming communication;
    analyzing the response request to determine whether the response request is suspicious;
    detecting the user responding to the response request; and
    blocking the user responding to the response request based at least in part on a determination that the response request is suspicious.

2. The method of claim 1, further comprising determining whether the incoming communication is sent from an unknown source.

3. The method of claim 1, further comprising generating an informational alert that indicates the incoming communication is a scam.

4. The method of claim 1, wherein the incoming communication type comprises a telephone call.

5. The method of claim 1, wherein the incoming communication type comprises a short messaging service (SMS) message.

6. The method of claim 1, further comprising detecting a bait flag linked to the incoming communication.

7. The method of claim 6, wherein the bait flag comprises a missed call indicator.

8. The method of claim 6, wherein the bait flag comprises an alert indicating receipt of an incoming SMS message.

9. The method of claim 1, wherein a suspicious response request comprises a request to establish communications with a premium telephone number.

10. A communications device configured to detect a scam, comprising:
    a processor;
    memory in electronic communication with the processor; and
    instructions stored in the memory, the instruction being executable by the processor to:
        detect an incoming communication at the communications device, the incoming communication being unsolicited;
        identify an incoming communication type based at least on the incoming communication;
        detect a response request from the incoming communication, the response request comprising a request that a user of the communications device respond to the incoming communication;
        analyze the response request to determine whether the response request is suspicious;
        detect the user responding to the response request; and
        block the user responding to the response request based at least in part on a determination that the response request is suspicious.

11. The communications device of claim 10, wherein the instructions are executable by the processor to determine whether the incoming communication is sent from an unknown source.

12. The communications device of claim 10, wherein the instructions are executable by the processor to generate an informational alert that indicates the incoming communication is a scam.

13. The communications device of claim 10, wherein the incoming communication type comprises a telephone call.

14. The communications device of claim 10, wherein the incoming communication type comprises a short messaging service (SMS) message.

15. The communications device of claim 10, wherein the instructions are executable by the processor to detect a bait flag linked to the incoming communication.

16. The communications device of claim 15, wherein the bait flag comprises a missed call indicator.

17. The communications device of claim 15, wherein the bait flag comprises an alert indicating receipt of an incoming SMS message.

18. The communications device of claim 10, wherein a suspicious request response comprises a request to establish communications with a premium telephone number.

19. A computer-program product for detecting a scam, the computer-program product comprising a non-transitory computer-readable medium having instructions thereon, the instructions comprising:
    code programmed to detect an incoming communication at the communications device, the incoming communication being unsolicited;

code programmed to identify an incoming communication type based at least on the incoming communication;

code programmed to detect a response request from the incoming communication, the response request comprising a request that a user of the communications device respond to the incoming communication;

code programmed to analyze the response request to determine whether the response request is suspicious;

code programmed to detect the user responding to the response request; and code programmed to block the user responding to the response request based at least in part on a determination that the response request is suspicious.

20. The computer-program product of claim 19, wherein the instructions further comprise code programmed to determine whether the incoming communication is sent from an unknown source.

* * * * *